United States Patent
Jeong et al.

(10) Patent No.: US 9,926,928 B2
(45) Date of Patent: Mar. 27, 2018

(54) OIL PUMP

(71) Applicant: Brose Fahrzeugteile GmbH & Co. Kommanditgesellschaft, Wuerzburg, Wuerzburg (DE)

(72) Inventors: Sangyong Jeong, Seoul (KR); Youngho Kim, Hwasung (KR); Ben Baer, Denfield (CA)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 148 days.

(21) Appl. No.: 15/006,580

(22) Filed: Jan. 26, 2016

(65) Prior Publication Data
US 2017/0211572 A1 Jul. 27, 2017

(51) Int. Cl.
| | |
|---|---|
| F04C 11/00 | (2006.01) |
| F04C 2/18 | (2006.01) |
| F04C 2/10 | (2006.01) |
| F04C 15/00 | (2006.01) |
| F01M 1/02 | (2006.01) |
| F16H 61/00 | (2006.01) |
| F16H 57/04 | (2010.01) |

(52) U.S. Cl.
CPC .......... F04C 11/006 (2013.01); F01M 1/02 (2013.01); F04C 2/102 (2013.01); F04C 2/18 (2013.01); F04C 15/0003 (2013.01); F04C 15/008 (2013.01); F04C 15/0061 (2013.01); F01M 2001/0238 (2013.01); F04C 2210/206 (2013.01); F04C 2240/20 (2013.01); F04C 2240/30 (2013.01); F04C 2240/40 (2013.01); F16H 57/0436 (2013.01); F16H 61/0025 (2013.01)

(58) Field of Classification Search
CPC . F01M 1/02; F01M 2001/0238; F04C 11/006; F04C 15/0003; F04C 15/0061; F04C 15/008; F04C 2/102; F04C 2/18; F04C 2210/206; F04C 2240/20; F04C 2240/30; F04C 2240/40; F16H 57/0436; F16H 61/0025
USPC .......................................................... 418/191
See application file for complete search history.

(56) References Cited

U.S. PATENT DOCUMENTS

| 3,583,839 A * | 6/1971 | Brundage | F04C 2/102 418/108 |
| 2004/0071559 A1* | 4/2004 | Ai | F04C 2/102 417/220 |
| 2013/0236346 A1* | 9/2013 | Kim | F04C 23/001 418/191 |

FOREIGN PATENT DOCUMENTS

DE     10 2012 111 637 A1     6/2014

* cited by examiner

*Primary Examiner* — Patrick Maines
*Assistant Examiner* — Dapinder Singh
(74) *Attorney, Agent, or Firm* — Muncy, Geissler, Olds & Lowe, P.C.

(57) ABSTRACT

An oil pump having a pump housing with a suction-side inlet and with a pressure-side first outlet, which is coupled to a first pump chamber, and with a pressure-side second outlet, which is coupled to a second pump chamber having a first pump rotor which is situated in the first pump chamber so as to be rotatable about a first axis, and having a second pump rotor which is situated in the second pump chamber so as to be rotatable about a second axis, wherein the pump rotors are arranged in a plane, oriented substantially perpendicular to the axes of the pump housing and are coupled by way of an external circumferential toothing.

13 Claims, 3 Drawing Sheets

OIL PUMP

BACKGROUND OF THE INVENTION

Field of the Invention

The invention lies in the field of oil pumps, preferably in the field of electrically operated or driven oil pumps, and relates to an oil pump of said type. An oil pump can be, for example, a main pump and/or an additional or auxiliary pump in or for a motor vehicle.

Description of the Background Art

An electric oil pump typically serves for delivering oil as lubricant for in particular moving parts or components, for example also of a vehicle (motor vehicle) driven by internal combustion engine, by hybrid technology or electrically. An oil pump of said type normally generates, owing to its delivery characteristics, an oil circuit, for example with an oil sump for accommodating excess oil and/or leakage oil.

Oil pumps of said type must be configured, or structurally designed, for relatively large temperature ranges. The temperature range that must be managed or allowed typically lies between −40° C. and 130° C. Here, it must also be taken into consideration that the lubricant (oil) that is used exhibits a certain or particular viscosity, which is temperature-dependent and which decreases with increasing temperature, that is to say is greater at low temperatures than at high temperatures.

In a vehicle gearbox, in particular in an automatic gearbox, there are often provided multiple parallel oil circuits with a respectively associated oil pump. Here, a distinction is typically made between one or more main (oil) circuits and one or more auxiliary or additional circuits, wherein a main circuit normally requires an oil pump with a higher volume flow than an auxiliary or additional circuit.

An auxiliary or additional pump, driven for example electrically or by electric motor, often serves for the at least intermittent lubrication or additional lubrication of gearbox parts of the vehicle gearbox. Here, the delivered oil also serves for the cooling of components or additional components of the drivetrain of a vehicle of said type. A main oil pump, which is driven for example electrically or by electric motor, serves, in a main circuit, in particular as an accumulator charging pump for providing a supply to, and for actuating, hydraulic gearbox parts, in particular hydraulic gearbox actuators for the engagement and/or shifting of gearbox ratios.

Pump types that are commonly used for such purposes are for example positive-displacement pumps (external-gearwheel pumps), sickle-cell pumps or vane-type pumps. A relatively inexpensive and in this case relatively pulsation-free pump type is an oil or auxiliary oil pump with a so-called gerotor (G-rotor pump). An oil pump of said type has a rotor set (gearwheel set) with an internally toothed outer ring (outer toothed ring) and an externally toothed inner rotor (inner gearwheel, inner toothed ring).

The prior art discloses, for example, pump units in the form of so-called tandem pumps. Here, by means of a single drive motor, two mutually independent volume flows, in particular for a main circuit and an auxiliary or additional circuit, are generated.

DE 10 2012 111 637 A1 has disclosed, for example, an oil pump for a motor vehicle, in the case of which oil pump two pump rotors formed as external-gearwheel sets are arranged in a common pump housing. The two pump rotors have in each case two intermeshing external gears for oil delivery, wherein the external-gearwheel sets are arranged coaxially one above the other in the pump housing such that in each case one gearwheel is driven by a common drive shaft. In this way, two pump chambers are realized within the pump housing, which pump chambers are arranged coaxially one above the other and are separated by way of a partition, whereby the known oil pump requires a relatively large structural volume.

SUMMARY OF THE INVENTION

It is therefore an object of the invention to provide an oil pump which is of reduced structural size and which is in particular suitable and designed for generating two independent volume flows, in particular for a main circuit and for a secondary circuit.

The oil pump according to the invention is designed in particular as an electric pump for a motor vehicle. The oil pump serves for delivering a fluid, in particular a (lubricating) oil. The oil pump has a pump housing with a suction-side inlet (inflow, suction opening, suction connector) and a pressure-side first outlet (outflow, pressure opening, pressure connector) and a pressure-side second outlet (outflow, pressure opening, pressure connector).

The first outlet is coupled to a first pump chamber, and the second outlet is coupled to a corresponding second pump chamber. Here, in the first pump chamber, there is arranged a first pump rotor which is situated therein so as to be rotatable about a first axis, wherein, in the second pump chamber, there is provided a second pump rotor which is situated therein so as to be rotatable about a second axis. The pump chambers are expediently each coupled to the common inlet. The pump chambers are preferably arranged within the pump housing and substantially decoupled from one another in terms of flow. This means that, within the pump housing, substantially no volume flow is possible between the two pump chambers. During a rotation of the pump rotors, the oil to be delivered is delivered both from the inlet to the first outlet and from the inlet to the second outlet.

It is preferably, in the case that the pump rotors are arranged adjacent to one another in a plane, oriented perpendicular or substantially perpendicular to the axes, of the pump housing and are coupled to one another in terms of drive by way of an external circumferential toothing. In other words, the pump chambers are arranged not co-axially one above the other in two separate planes but in one common, in particular transverse plane. In this way, an oil pump is realized which is compact in particular in terms of an axial structural size.

The electric oil pump is in particular a combined pump unit composed of a main oil pump, which is formed in particular by the first pump rotor, and an auxiliary or additional pump, which is formed in particular by the second pump rotor. For this purpose, the oil pump is, in an intended manner, arranged in a vehicle gearbox, in particular in an automatic or dual-clutch gearbox, of the motor vehicle. Through the use of the oil pump of compact structural size, it is the case here that additional degrees of freedom are realized in a structural space of said type, whereby the flexibility of the oil pump and that of a vehicle gearbox equipped therewith are advantageously increased. In particular, in this way, a single, compact oil pump is provided both for gearbox cooling and for the actuation of the gearbox actuators by way of the delivered oil.

The inlet can be connected in terms of flow to an oil sump as reservoir, wherein, for example, the first outlet is connected to a first oil circuit and the second outlet is connected to a second oil circuit. Here, the delivered (lubricating) oil also serves, for example, for the cooling or actuation of the components or additional components of a drivetrain of a motor vehicle of said type. Here, the expression "oil" is in particular not to be understood as being restricted to mineral oils. Rather, use may also be made of a fully synthetic or partially synthetic oil, a silicone oil, or other oil-like liquids, such as for example a hydraulic liquid or a cooling lubricant.

In an embodiment, during the operation of the oil pump, only one of the pump rotors is driven. Owing to the in particular meshing external toothing of the pump rotors, common drive by means of only one drive or motor shaft is made possible in a structurally simple manner.

In an embodiment, the pressure level at the first outlet is higher than the pressure level at the second outlet. The first outlet is thus expediently preferably connected to a main circuit for providing a supply to, and for actuating, hydraulic gearbox parts, whereas the second outlet is in particular coupled to an auxiliary or additional circuit. The auxiliary or additional circuit is for example provided for the demand-dependent lubrication or additional lubrication of gearbox parts.

In a particularly space-saving and exemplary embodiment, the second pump chamber can be integrated in the first pump rotor. In other words, the externally toothed first pump rotor can be at least partially hollow, wherein the second pump chamber can be formed by the recess in the first pump rotor. In this way, the pump chambers are arranged within the pump housing so as to be nested substantially one inside the other. A particularly space-saving pump housing is realized in this way. Here, the compact pump housing has an advantageous effect on the flexibility and the structural size of the oil pump.

In an embodiment, the first pump rotor can be in the form of an external gearwheel and the second pump rotor is in the form of a gerotor. The gerotor has an outer toothed ring which is mounted centrally in the pump housing and which has an internal toothing, in which there is arranged an inner gearwheel (inner toothed ring) which meshes with the internal toothing and which is mounted eccentrically with respect to the outer toothed ring.

Owing to the external circumferential toothing of the pump rotors, an external toothing of the outer toothed ring of the gerotor is provided, which external toothing meshes with the external gearwheel of the first pump rotor. In other words, therefore, a gerotor pump is substantially integrated within an external gearwheel of an external-gearwheel pump. A particularly inexpensive and compact oil pump, with a reduced number of components, is realized in this way.

The external gearwheel and the externally toothed outer toothed ring of the gerotor thus deliver oil from the inlet to the first outlet during the operation of the oil pump, wherein, owing to the rotation of the outer toothed ring thereby caused, the inner gearwheel runs in the internal toothing, such that oil is delivered from the inlet to the second outlet.

The external-gearwheel pump thus formed exhibits, for functional reasons, high robustness and high efficiency, whereby a particularly suitable pump arrangement for providing a supply to a main circuit, and to the gearbox actuators coupled thereto, is provided. The auxiliary or additional circuit is in this case coupled to the relatively pulsation-free gerotor pump, such that highly uniform lubrication and/or cooling of the gearbox parts are/is ensured. In particular, by means of this arrangement, it is possible in a simple manner to firstly realize two different oil pressures for the two connected oil circuits by way of only one driven drive shaft, and to secondly realize an oil pump which is of compact structural size and has a particularly reduced number of components. Owing to the reduced number of components, and owing to the compact and integrated design, the mass of the pump as well as the production costs for the oil pump are advantageously reduced.

In an embodiment, the first pump chamber formed by the pump housing can have an oval cross-sectional area. The oval cross-sectional area is particularly expedient in particular with regard to the design with the external-gearwheel set. It is preferable for the external gearwheel and/or the externally toothed outer toothed ring of the gerotor to have a radial clearance with respect to the circumferential side walls of the pump housing. Here, the radial clearance advantageously yields extremely quiet operation of the oil pump. Here, the radial clearance is suitably dimensioned such that, in the presence of the operating temperatures (oil temperatures) that arise, and the thermal expansions of the pump rotors that may occur as a result, a minimum radial clearance always exists.

In an embodiment, the pump housing can have a substantially oval housing main body and an in particular plate-like housing cover and an in particular plate-like housing base. The housing cover and the housing base and the housing main body are in this case formed as separate components. Between the housing main body and the housing cover, and between the housing main body and the housing base, there is arranged in each case one sealing element for sealing off, in fluid-tight fashion, the first pump chamber that is thereby formed.

The pump housing serves for the mounting of the gearwheel sets of the pump rotors, and/or accommodates said gearwheel sets in a suitable manner. Whereas the housing base forms a first side plate of the oil pump, the opposite side plate is formed by the housing cover. The band-like housing main body forms, substantially, an oval side or circumferential wall of the pump housing. The housing base and the housing cover thus expediently serve for closing off the housing main body which is open on both sides, that is to say said housing base and housing cover are, in the assembled state, arranged on axially opposite opening sides of the housing main body in order to close off the latter.

The sealing elements are in particular oval sealing rings composed of an elastic plastic material, and are expediently arranged in each case along the outer circumference of the opening sides of the housing main body. By means of the sealing elements, the housing interior or the first pump chamber is sealed off in substantially fluid-tight fashion at the connecting points between the housing main body and the housing cover and between the housing main body and the housing base. Here, it is for example conceivable that an axial clearance for the pump rotors is additionally provided by way of the sealing elements.

In an embodiment, the inlet and the first outlet and the second outlet can be provided in the housing base. In other words, all of the connections for the oil supply and oil discharge are arranged on a single side of the housing, whereby the connection and the installation of the oil pump in a motor vehicle gearbox are greatly simplified.

Here, the opposite housing cover suitably has a sleeve-like shaft leadthrough with a bearing sleeve situated therein for the mounting and leadthrough of a drive or motor shaft for the coupling of the driven pump rotor.

In an embodiment, the inlet can be formed as a circular arc-shaped recess of the pump housing, in particular of the housing base. Here, the inlet extends in curved or sickle-like fashion from the first pump chamber into the second pump chamber. In other words, the inlet opening runs from an inlet point of the external-gearwheel pump into the cavity or interior space, formed by the internal toothing, of the outer toothed ring of the gerotor. The outer toothed ring thus acts substantially as a partition between the first and the second pump chamber. In this way, a structurally particularly simple inlet for both pump chambers is provided.

In an embodiment the second outlet of the second pump chamber can be connected as an inlet and the sickle-like inlet is realized solely as an inlet from the second pump chamber into the first pump chamber. As a result, the output pressure from the second pump chamber can be used as the input pressure of the first pump chamber. In other words the second pump rotor in this embodiment acts as a backing pump of the first pump rotor.

In an exemplary embodiment, the oil pump is designed in particular as an electromotively driven oil pump, and, for this purpose, in accordance with its function, has an electric motor arranged outside the pump housing. The electric motor has a rotor or motor shaft which runs coaxially with respect to the axis of the first or second pump rotor. The electric motor is for example in the form of a brushless direct-current motor, and is arranged in a motor housing, which is preferably fastened to the pump housing.

For the drive of the oil pump, the electric motor can be arranged, at the cover side, axially above the gearwheel (toothed ring) which is to be driven, wherein the motor shaft runs in particular in alignment with the in each case coaxially oriented axis of the respective gearwheel.

In an embodiment in which the first pump rotor is driven, the electric motor can be seated for example above the external gearwheel, and drives the latter by way of the motor shaft. As a result of the rotation of the external gearwheel, the outer toothed ring that meshes therewith, and thus the inner gearwheel of the integrated gerotor pump, are driven.

In an embodiment, the outer toothed ring can be driven, whereby the drive torque is transmitted both to the external gearwheel, which meshes by means of the external toothing, and to the inner gearwheel, which meshes by means of the internal toothing.

Also, in an embodiment in which only the inner gearwheel of the gerotor is driven, the drive torque can be coupled by way of the outer toothed ring to the external gearwheel of the first pump rotor. Here, the inner gearwheel is expediently coupled to an eccentrically arranged shaft journal (shaft end) of the motor shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
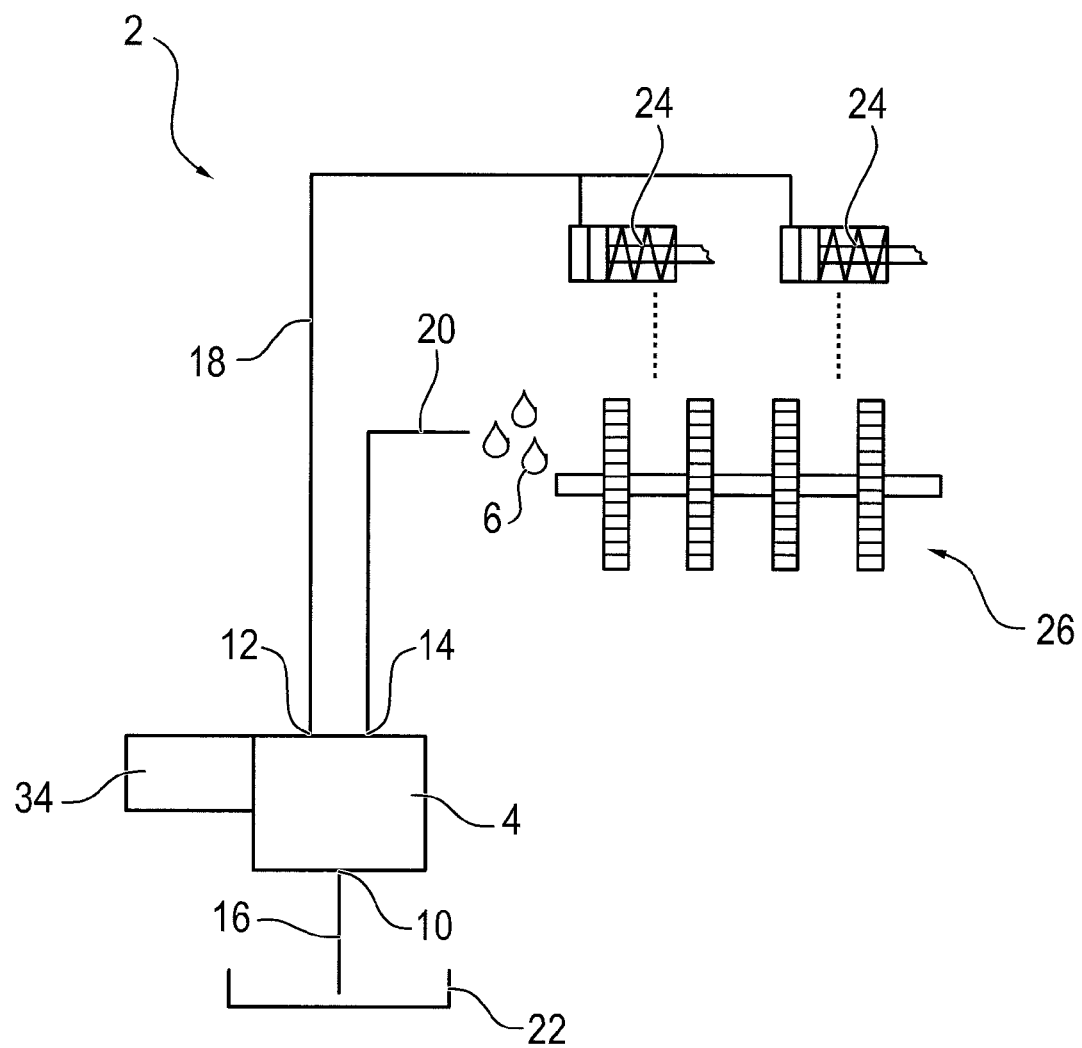
FIG. 1 is a schematic and simplified illustration of an oil circuit of a motor vehicle with an electromotively driven oil pump.

FIG. 1 shows a subregion of an oil circuit 2 of a motor vehicle (not illustrated in any more detail). The oil circuit 2 comprises an electromotively driven pump 4 as a combined main oil pump and auxiliary or additional pump for delivering a fluid 6, in particular a (lubricating) oil, to gearbox parts of a vehicle gearbox.

The pump 4, also referred to below as oil pump, has a substantially closed pump housing 8 with a low-pressure-side inlet 10 as inflow or feed connector, and in each case one high pressure-side first outlet 12 and one high pressure-side second outlet 14, as outflow or pressure connectors. For the purposes of a connection in terms of flow to the oil circuit 2, the inlet 10 is connected to a low-pressure line 16, the outlet 12 is connected to a main oil line 18, and the outlet 14 is connected to an auxiliary or additional line 20.

During the operation of the oil pump 4, the oil 6 is drawn out of an oil sump 22 via the inlet 10 by means of the low-pressure line 16, and is pumped via the outlets 12 and 14 into the main oil line 18 and into the auxiliary or additional line 20 respectively. The main oil line 18 forms a main oil circuit of the oil circuit 2 and is provided in particular for providing a supply to, and for actuating, hydraulic gearbox actuators 24, by means of which, for example, the gear ratios of a gearbox arrangement 26 of a vehicle gearbox, which is designed preferably as an automatic gearbox or dual-clutch gearbox, are engaged or shifted. The auxiliary or additional line 20 is correspondingly in particular part of an auxiliary or additional circuit for the at least intermittent lubrication or additional lubrication of gearbox parts, for example of the gearbox arrangement 26.

Figure 2:
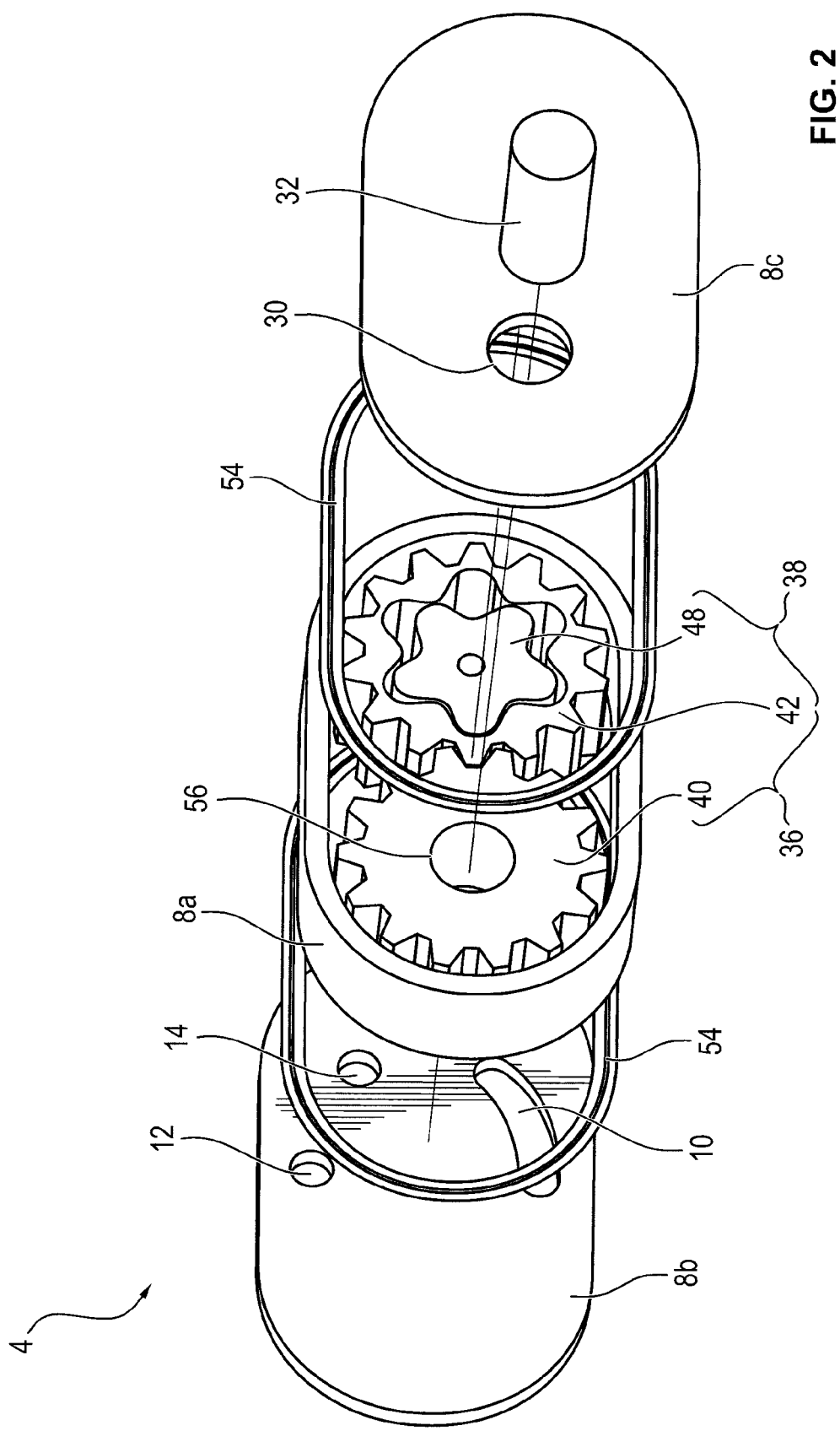
FIG. 2 shows the oil pump in an exploded illustration.

As per FIGS. 2 and 3, the oil pump 2 has the pump housing 8 which is composed for example of steel or of aluminium and which is in the form of a band-like (first) housing part, referred to hereinafter as housing main body 8a, a plate-like (second) housing part, referred to hereinafter as housing base 8b, and a plate-like (third) housing part, referred to hereinafter as housing cover 8c. The housing main body 8a forms a cylindrical housing wall with an approximately oval cross-sectional area. The housing main body 8a has two housing openings situated opposite one another on the face sides, which housing openings are, in the assembled state, closed off by the housing base 8b, at one side, and by the housing cover 8c, at the other side, such that an approximately cylindrical interior space 28 is formed. A cover-side bearing opening 30 serves, in conjunction with a bearing sleeve (not illustrated in any more detail), for the plain-bearing mounting of a motor shaft 32 of an electric motor 34.

The preferably electrically or electronically commutated electric motor 34 is arranged in a motor housing (not illustrated in any more detail) and is mounted on the pump housing 8 at the cover side. The electric motor 34 substantially comprises a stator, which is fixed with respect to the housing, and a rotor, which is mounted rotatably in said stator and which is connected fixedly to the motor shaft 32. During operation, a motor current is imparted to the stator winding of the stator by a motor controller. The alternating field thereby generated causes the motor shaft 32 to rotate. Two pump rotors 36 and 38 of the oil pump 4 are coupled to the motor shaft 32, such that, during the operation of the oil pump 6, oil 6 is delivered from the inlet 10 to the outlets 12 and 14.

Here, the pump rotor 36 is designed in particular in the form of an external-gearwheel pump and, for this purpose, has two intermeshing external gearwheels 40 and 42. The external gearwheels 40 and 42 are arranged in the interior space 28, hereinafter also referred to as pump chamber, of the pump housing 8, wherein the motor shaft 32 is coupled in terms of drive to the external gearwheel 40. During operation, oil 6 enters the pump chamber 28 via the inlet 10 and, by means of the rotating external gearwheels 40 and 42 on in each case one circular path, is delivered radially outward, that is to say perpendicular to a respective (gearwheel) axis $A_1$ and $A_2$, along the inner wall of the housing main body 8a, and exits the oil pump 4 via the outlet 12.

As can be seen relatively clearly in FIGS. 2 and 3, the external gearwheel 42 is in particular in the form of an externally toothed outer toothed ring, and will hereinafter also be referred to as such. The outer toothed ring 42 has an interior space 44, which is coupled to the inlet 10 and to the outlet 14, as second pump chamber. In the outer toothed ring 42 or in the pump chamber 44, there is placed (mounted) a gearwheel set in the form of a pump rotor 38 with an internal toothing 46 of the outer toothed ring 42 and with an externally toothed inner gearwheel 48.

In all rotational positions relative to the outer toothed ring 42, the inner gearwheel 48 lies with its external toothing 50 in partially meshing fashion between or in the internal toothing 46 of said outer toothed ring. Here, some of the undulating teeth of the external toothing 50 lie in the also undulating tooth spaces of the internal toothing 46 of the outer toothed ring 42, and vice versa, whereas other teeth of the external toothing 50 of the inner gearwheel 48 can slide along on a circumferential section of the internal toothing 46 of the outer toothed ring 42 without meshing engagement. A gearwheel set (42, 48) of said type as pump rotor 38 is also referred to as gerotor (G-rotor).

The outer toothed ring 42 is thus firstly, by way of its external toothing 52, a part of the external-gearwheel pump of the pump rotor 36, and secondly, by way of its internal toothing 46, a part of the gerotor of the pump rotor 38. In other words, the pump rotor 38 is at least partially integrated in the pump rotor 36; in particular, in this way, the pump chamber 44 is arranged in nested fashion within the pump chamber 28.

Figure 3:
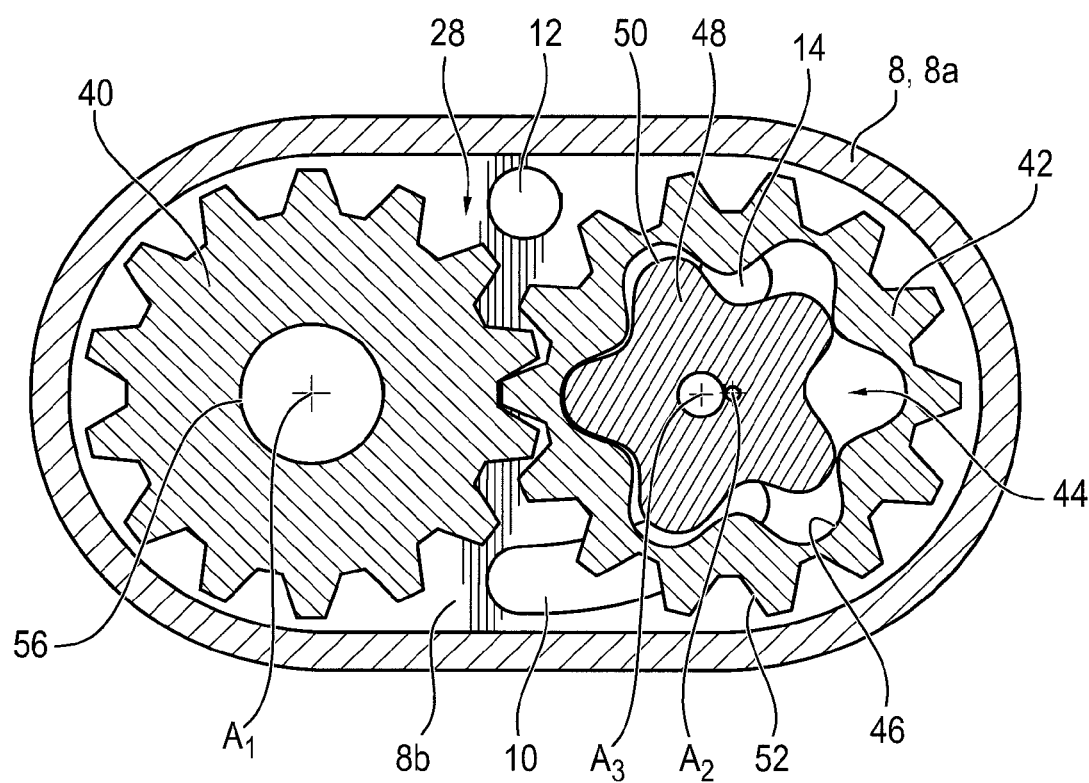
FIG. 3 shows the oil pump in a sectional illustration.

As indicated in FIG. 3 on the basis of the axes $A_1$, $A_2$ and $A_3$ denoted by plus signs, the axis $A_3$ of the inner gearwheel 48 is radially spaced apart (eccentrically) with respect to the central axis (mid-axis/axis of symmetry) $A_2$, which forms the axis of rotation of the outer toothed ring 42.

By contrast to the external-gearwheel pump, it is thus the case in an inner-gearwheel or toothed ring pump of said type, as a specific type of gearwheel pump, that the inner gearwheel 48 (inner toothed ring) runs eccentrically in the outer toothed ring (toothed ring at the outside) 42. In the case of this toothed ring pump, the oil 6 is delivered through the displacement chamber, which changes in volume, between the tooth spaces of the toothed rings 42 and 48. In other words, in the case of this gearwheel pump, also referred to as sickle-type pump, the oil 6 to be delivered is delivered in the spaces between the tooth spaces of the two toothed rings (gearwheels) 42 and 48, wherein the teeth are sealed off by the sickle between the inwardly directed internal toothing 46 of the outer toothed ring 42 and the outwardly directed external toothing 50 of the inner gearwheel 48. Here, the internal toothing 46 of the outer toothed ring 42 has precisely one tooth more than the external toothing 50 of the inner gearwheel 48 (trochoid toothing).

The pump chambers 28 and 44 are closed off at one side by the housing base 8b and at the other side by the housing cover 8c. Furthermore, for sealing off the pump chamber 28, two sealing elements 54 are arranged along the outer circumference of the opening edges of the housing main body 8a. The sealing elements 54 are in particular formed as oval sealing rings composed of an elastic or rubber-like plastics material. By means of the sealing elements 54, the pump chamber 28 is sealed off in substantially fluid-tight fashion at the connecting points between the housing main body 8a and the housing cover 8c and between the housing main body 8a and the housing base 8b.

The inlet 10 and the outlets 12 and 14 are formed in the housing base 8b. Here, the outlets 12 and 14 each have an approximately circular opening cross section, wherein the inlet 10 is formed as an approximately circular arc-shaped housing recess. The inlet 10 extends along its curved profile in particular from the pump chamber 28 of the pump housing 8 into the pump chamber 44 of the outer toothed ring 42.

During the operation of the oil pump 4, the external gearwheel 40 is driven by way of the motor shaft 32. For this purpose, the external gearwheel 40 has, for coupling to the motor shaft 32, a contoured joining contour 56, for example. The joining contour 56 is coaxially aligned, along the axis $A_1$, with the bearing or shaft opening 30 of the housing cover 8c. By means of the external toothing 52, which meshes with the external gearwheel 40, of the outer toothed ring 42, the inner gearwheel 48 is driven owing to the rotating internal toothing 46.

In this way, oil 6 is delivered both from the inlet 10 to the outlet 12 by means of the formed external gearwheel pump of the pump rotor 36, and from the inlet 10 to the outlet 14 by means of the gerotor of the pump rotor 38. In accordance with the function, the delivered oil 6 has a higher (oil) pressure at the outlet 10 than at the outlet 12; in other words, a greater (oil) volume flow is delivered into the main oil line 18 than into the auxiliary or additional line 20.

In a first alternative refinement, it is for example the case that the outer toothed ring 42 is coupled to the motor shaft 32. For this purpose, the outer toothed ring 42 expediently has the joining contour 56, wherein the shaft opening 30 of the housing cover 8c is arranged coaxially with respect to the axis $A_2$. As a result of the rotation of the outer toothed ring 42, it is the case both that the external gearwheel 40 is driven by way of the external toothing 52 that meshes therewith, and that the inner gearwheel 48 is driven by way of the internal toothing 46.

In a second alternative refinement, it is in particular the case that the eccentrically mounted inner gearwheel 48 is coupled to the motor shaft 32. For this purpose, the inner gearwheel 48 expediently has the joining contour 56 which, in this exemplary embodiment, interacts in particular with an eccentrically arranged counterpart contour on the pump-side shaft end of the motor shaft 32.

The various described refinements and exemplary embodiments have in common the fact that the pump rotor 36 acts in particular as a main oil pump, and the pump rotor 38 that is at least partially integrated therein acts in particular as an auxiliary or additional oil pump of the oil circuit 2, regardless of which gearwheel or which toothed ring is driven. It is essential that, as a result of the integrated design of the pump rotors 36 and 38, two mutually different oil pressures or volume flows are generated at the outlets 12 and 14 of the oil pump 4.

The invention is not restricted to the exemplary embodiments described above. Rather, it is also possible for other variants of the invention to be derived therefrom by a person skilled in the art without departing from the subject matter of the invention. In particular, all of the individual features described with the exemplary embodiments may also be combined with one another in other ways without departing from the subject matter of the invention.

LIST OF REFERENCE DESIGNATIONS

2 Oil circuit
4 Pump/oil pump

6 Fluid/oil
8 Pump housing
8a Housing main body
8b Housing base
8c Housing cover
10 Inlet
12 Outlet
14 Outlet
16 Low-pressure line
18 Main oil line
20 Auxiliary or additional line
22 Oil sump
24 Gearbox actuator
26 Gearbox arrangement
28 Interior space/pump chamber
30 Bearing opening/shaft opening
32 Motor shaft
34 Electric motor
36 Pump rotor
38 Pump rotor
40 External gearwheel
42 External gearwheel/outer toothed ring/toothed ring
44 Interior space/pump chamber
46 Internal toothing
48 Inner gearwheel/toothed ring
50 External toothing
52 External toothing
54 Sealing element
56 Joining contour
$A_1, A_2, A_3$ Axis

What is claimed is:

1. An oil pump comprising:
a pump housing with a suction-side inlet and with a pressure-side first outlet, which is coupled to a first pump chamber, and with a pressure-side second outlet, which is coupled to a second pump chamber;
a first pump rotor that is arranged in the first pump chamber so as to be rotatable about a first axis; and
a second pump rotor that is arranged in the second pump chamber so as to be rotatable about a second axis,
wherein the first and second pump rotors are arranged in a plane, oriented substantially perpendicular to the axes, of the pump housing and are coupled by way of an external circumferential toothing, and
wherein the first pump rotor is an external gearwheel and the second pump rotor includes an outer toothed ring, the external gearwheel and the outer toothed ring positioned adjacent one another such that external teeth of the external gearwheel mesh with external teeth of the outer toothed ring.

2. The oil pump according to claim 1, wherein, during operation, only one of the first and second pump rotors is driven.

3. The oil pump according to claim 1, wherein a pressure level at the second outlet is higher than a pressure level at the first outlet.

4. The oil pump according to claim 1, wherein the second pump chamber is integrated in the second pump rotor.

5. The oil pump according to claim 1, wherein the first pump chamber formed by the pump housing has an oval cross-sectional area.

6. The oil pump according to claim 1, wherein the pump housing has a housing main body and a plate-like housing cover and a plate-like housing base, wherein, both between the housing main body and the housing cover and between the housing main body and the housing base there is arranged a sealing element.

7. The oil pump according to claim 6, wherein the inlet and the first outlet and the second outlet are provided in the housing base.

8. The oil pump according to claim 1, wherein the inlet is a circular arc-shaped recess of the pump housing or of a housing base of the pump housing, and wherein the recess extends from the first pump chamber into the second pump chamber.

9. An electromotively driven oil pump comprising an electric motor that is arranged outside a pump housing and a motor shaft that runs coaxially with respect to an axis of the first or second pump rotor.

10. The oil pump according to claim 1, wherein the suction-side inlet is the sole inlet of the oil pump.

11. The oil pump according to claim 1, wherein the second pump rotor is a gerotor with the outer toothed ring having internal toothing and with an inner gearwheel that meshes with the internal toothing and that is mounted eccentrically with respect to the outer toothed ring.

12. The oil pump according to claim 1, wherein the first pump chamber is decoupled from the second pump chamber such that no volume flow occurs between the first pump chamber and the second pump chamber.

13. An oil pump comprising:
a pump housing with a suction-side inlet and with a pressure-side first outlet, which is coupled to a first pump chamber, and with a pressure-side second outlet, which is coupled to a second pump chamber;
a first pump rotor that is arranged in the first pump chamber so as to be rotatable about a first axis; and
a second pump rotor that is arranged in the second pump chamber so as to be rotatable about a second axis,
wherein the first and second pump rotors are arranged in a plane, oriented substantially perpendicular to the axes, of the pump housing and are coupled by way of an external circumferential toothing, and
wherein the first pump rotor is an external gearwheel and the second pump rotor is a gerotor with an outer toothed ring with internal toothing and with an inner gearwheel that meshes with the internal toothing and that is mounted eccentrically with respect to the outer toothed ring.

* * * * *